(12) United States Patent
Jin et al.

(10) Patent No.: US 12,499,372 B2
(45) Date of Patent: Dec. 16, 2025

(54) METHOD, DEVICE, AND SYSTEM FOR COMPOUND CLUSTERING AND STORAGE MEDIUM

(71) Applicant: Ainnocence Technologies LLC, Miami, FL (US)

(72) Inventors: Yutong Jin, Zhengzhou (CN); Lurong Pan, Vestavia Hill, AL (US)

(73) Assignee: Ainnocence Technologies LLC, FL (US)

(*) Notice: Subject to any disclaimer, the term of this patent is extended or adjusted under 35 U.S.C. 154(b) by 841 days.

(21) Appl. No.: 17/842,825

(22) Filed: Jun. 17, 2022

(65) Prior Publication Data
US 2023/0376794 A1 Nov. 23, 2023

(51) Int. Cl.
*G06N 5/022* (2023.01)

(52) U.S. Cl.
CPC ................................ *G06N 5/022* (2013.01)

(58) Field of Classification Search
CPC ......... G06N 20/00; G06N 5/022; G16C 20/70
See application file for complete search history.

(56) References Cited

U.S. PATENT DOCUMENTS

| | | | |
|---|---|---|---|
| 6,541,203 B2 * | 4/2003 | Mitchison | C12Q 1/6816 435/6.12 |
| 11,341,367 B1 * | 5/2022 | Barbosa | G06F 18/2148 |
| 2002/0022933 A1 * | 2/2002 | Johnson | G16C 20/80 702/27 |
| 2012/0290624 A1 * | 11/2012 | Singh | G06F 16/00 707/E17.044 |
| 2018/0328934 A1 * | 11/2018 | Campbell | G01N 33/6848 |
| 2023/0297886 A1 * | 9/2023 | Glaser | G06N 20/00 706/12 |

\* cited by examiner

*Primary Examiner* — Etienne P Leroux
(74) *Attorney, Agent, or Firm* — Jason C. Cameron

(57) ABSTRACT

The present application provides a method, a device, and a system for compound clustering and a storage medium, including acquiring samples of compounds to be identified, and segmenting the samples of the compounds into a subset of samples including an initial identification tag; obtaining a sample legend according to the sample subset; and obtaining target identification tag results corresponding to the samples of the compounds according to the sample legend and the identification tag, wherein the identification tag includes the initial identification tag. The present invention provides an efficient, rapid and accurate method for small molecule compound clustering based on statistical compound clustering, improving the accuracy of small molecule compound clustering, reducing the processing space of clustering and breaking through the limitations of small molecule clustering, thereby making the processing of small molecule compound clustering more efficient and accurate.

7 Claims, 5 Drawing Sheets

300

```
┌─────────────────────────────────────────────────────────────┐
│  SMILES: SAMPLES OF COMPOUNDS TO BE IDENTIFIED IN THE SMILES │
│                     SEQUENCE TEXT FORMAT                     │
│  310                                                         │
└─────────────────────────────────────────────────────────────┘
                              │
                              ▼
┌─────────────────────────────────────────────────────────────┐
│   DIVIDING THE SAMPLES OF THE COMPOUNDS TO BE IDENTIFIED     │
│   INTO SUBSETS OF SAMPLES CONTAINING THE INITIAL ID TAGS     │
│   320         ACCORDING TO STATISTICAL CLUSTERING            │
└─────────────────────────────────────────────────────────────┘
                              │
                              ▼
┌─────────────────────────────────────────────────────────────┐
│   CONVERTING THE SAMPLES OF THE COMPOUNDS TO BE IDENTIFIED   │
│    IN THE SMILES SEQUENCE TEXT FORMAT IN THE SAMPLE SUBSET   │
│   330   INTO A DISCRETE MATHEMATICAL GRAPH (A SAMPLE LEGEND) │
└─────────────────────────────────────────────────────────────┘
                              │
                              ▼
┌─────────────────────────────────────────────────────────────┐
│    CALCULATING THE MOST SIMILAR SUBGRAPH BY TOPOLOGICAL      │
│    COMPARISON ON THE DISCRETE MATHEMATICAL GRAPH IN THE      │
│   340      SAMPLE SUBSET TO OBTAIN THE LEGEND TAG            │
└─────────────────────────────────────────────────────────────┘
                              │
                              ▼
┌─────────────────────────────────────────────────────────────┐
│    OBTAINING THE TARGET ID RESULTS CORRESPONDING TO THE      │
│   SAMPLES OF THE COMPOUNDS TO BE IDENTIFIED ACCORDING TO     │
│   350 THE SAMPLE LEGEND, THE INITIAL ID TAG, AND THE LEGEND TAG │
└─────────────────────────────────────────────────────────────┘
                              │
                              ▼
┌─────────────────────────────────────────────────────────────┐
│     OUTPUTTING CLUSTERING RESULTS OF THE SAMPLES OF THE      │
│      COMPOUNDS TO BE IDENTIFIED INTO THE SMILES SEQUENCE     │
│   360                                                        │
└─────────────────────────────────────────────────────────────┘
```

FIG. 3

METHOD, DEVICE, AND SYSTEM FOR COMPOUND CLUSTERING AND STORAGE MEDIUM

CROSS-REFERENCE TO RELATED APPLICATIONS

This Application claims priority from a patent application filed in China having Patent Application No. 202210537018X filed on May 17, 2022 and titled "A COMPOUND CLUSTERING METHOD, DEVICE, SYSTEM AND STORAGE MEDIUM".

FIELD OF INVENTION

The present application relates to the technical field of information processing, and particularly relates to a method, device, system for compound clustering, and a storage medium.

BACKGROUND

We generally refer to molecules composed of a few or a few tens of atoms as small molecules which can be substances in solid, gaseous or liquid states at normal temperature. Common organic small molecule compounds include such as ethanol, glucose and methane.

Clustering is used to subdivide a large data set of compounds into single small groups of similar compounds. It is generally used for analysis of high-throughput screening results, virtual screening or docking studies. Traditional clustering methods based on chemical informatics have low identification tag efficiency and slow identification tag speed. Even if the similarity of fingerprint features of a compound is used for identification, there is an excessive demand for computation and storage space, resulting in a limited number of identified compounds. Therefore, there is a need for a new solution.

SUMMARY

In view of the above, embodiments of the present description provide a method, a device, and a system for compound clustering, and a storage medium, for a small molecule compound clustering process.

The embodiments of the present description provide the following technical solutions.

Embodiments of the present disclosure provide a method for compound clustering, comprising:
  Acquiring samples of compounds to be identified, and segmenting the samples of the compounds into a subset of samples including an initial identification tag;
  obtaining a sample legend according to the sample subset; and
  obtaining target identification tag results corresponding to the samples of the compounds according to the sample legend and the identification tag, wherein the identification tag includes the initial identification tag.

The present description also provides, in an embodiment, a device for compound clustering, comprising an acquisition module configured for acquiring samples of compounds to be identified, and segmenting the samples of the compounds into a subset of samples including an initial identification tag; an obtaining module configured for obtaining a sample legend according to the sample subset; and an output module configured for obtaining target identification tag results corresponding to the samples of the compounds according to the sample legend and the identification tag, wherein the identification tag includes the initial identification tag.

The present description also provides, in an embodiment, a system for compound clustering, comprising: a memory, a processor and a computer program stored in the memory, and the computer program is operated by the processor to perform the following steps: acquiring samples of compounds to be identified, and segmenting the samples of the compounds into a subset of samples including an initial identification tag; obtaining a sample legend according to the sample subset; and obtaining target identification tag results corresponding to the samples of the compounds according to the sample legend and the identification tag, wherein the identification tag includes the initial identification tag.

The embodiments of the present description also provide a readable storage medium, and the readable storage medium has stored therein a computer program which when executed by a processor implements the following steps: acquiring samples of compounds to be identified, and segmenting the samples of the compounds into a subset of samples including an initial identification tag; according to the subset of samples; obtaining a sample legend according to the sample subset; and obtaining target identification tag results corresponding to the samples of the compounds according to the sample legend and the identification tag, wherein the identification tag includes the initial identification tag.

Compared with the prior art, the advantageous effects that can be achieved by the above-mentioned at least one technical solution adopted by the embodiments of the present description at least include: acquiring samples of compounds to be identified, and segmenting the samples of the compounds into a subset of samples including an initial identification tag; obtaining a sample legend according to the sample subset; and obtaining target identification tag results corresponding to the samples of the compounds according to the sample legend and the identification tag. On the basis of coarse-grained identification tag of small molecule compound clustering, the identification tag and detection of compound image can be added to improve the accuracy of small molecule compound clustering, reduce the processing space of clustering, and break through the limitations of small molecule clustering, thereby making the processing of small molecule compound clustering more efficient and accurate.

BRIEF DESCRIPTION OF THE DRAWINGS

In order to explain the technical solutions in the embodiments of the present application more clearly, the following will briefly introduce the drawings that need to be used in the description of the embodiments or the prior art. Obviously, the drawings in the following description are only some embodiments of the present application. For those of ordinary skill in the art, other drawings can be obtained based on these drawings without creative work.

FIG. 3 is a flow chart II of a method for compound clustering provided by an embodiment of the description;

DETAILED DESCRIPTION OF THE DISCLOSURE

Figure 1:
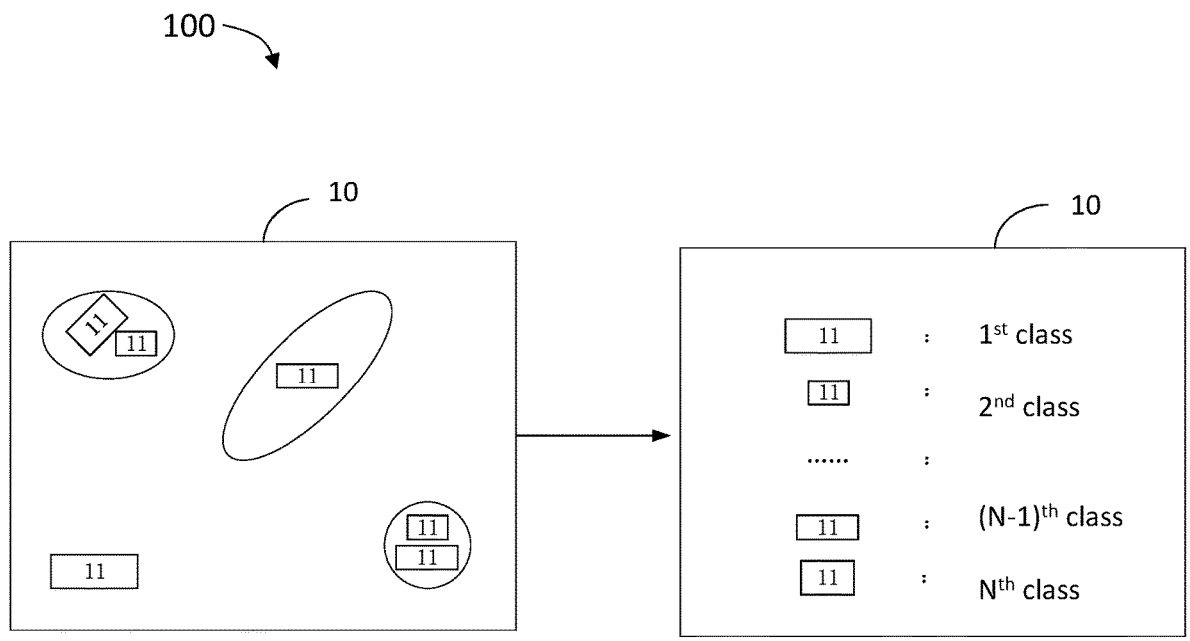
FIG. 1 is a schematic diagram of an application of compound clustering provided by an embodiment of the description.

The embodiments of this application are described in detail in combination with the accompanying drawings below.

Additional advantages and effects of the present application will become readily apparent to those skilled in the art from illustrating by way of example the embodiments of the present disclosure. Obviously, the described embodiments are only some, but not all, embodiments of the present application. The present application may be practiced or applied in various other specific embodiments, and various details in the description may be modified or varied from different viewpoints or application without departing from the spirit of the application. It should be noted that the embodiments and the features in the embodiments below may be combined with one another without conflict. Based on the embodiments in the present application, all other embodiments obtained by a person skilled in the art without involving any inventive effort are within the scope of protection of the present application.

It should be noted that the figures provided in the following examples merely illustrate the basic idea of the present application in a schematic way. Thus, only the components related to the present application are shown in the drawings instead of being drawn according to the number, shape and size of the components in an actual implementation. In an actual implementation, the type, number and proportion of the components may be changed at will, and the layout of the components may be more complicated.

In addition, in the following description, specific details are provided to facilitate a thorough understanding of the examples. However, it will be understood by those skilled in the art that the present invention may be practiced without these specific details.

Small molecule compound clustering is commonly used for analysis of high-throughput screening results, virtual screening or docking studies. Traditional clustering methods based on chemical informatics have low identification tag efficiency and slow identification tag speed. Even if the similarity of fingerprint features of a compound is used for identification, there is an excessive demand for computation and storage space, resulting in a limited number of identified compounds.

In view of this, the inventors have found that the results of machine learning small molecule compound clustering in the prior art tend to be fuzzy and inaccurate, resulting in the inability to identify fixed types in the compound information and causing processing results that are useless. Even if the similarity of compound fingerprint features is used, the utilization rate of processing and storage space is too high, which results in that small molecule compound clusters cannot expand to a compound library with a level of more than 100,000, resulting in the limitation of small molecule compound clustering.

Based on this, the embodiment of the present description proposes a processing solution for compound clustering. FIG. 1 is a schematic diagram of an application of compound clustering 100 provided by an embodiment of the description As shown in FIG. 1, a sample 11 of the compound to be identified, for example a large compound, is included. The sample 11 of the compound to be identified is segmented into a subset of samples including an initial identification tag; a sample legend is obtained according to the sample subset; target identification tag results (for example, including a first class, a second class, an $(n-1)^{th}$ class and an $n^{th}$ class) corresponding to the samples of the compounds is obtained according to the sample legend and the identification tag.

The implementation may be performed by a main body, such as a server 10, where the server includes terminal devices capable of running software, including but not limited to computers, tablets, cell phones, etc.

A method for compound clustering is proposed in an embodiment of the present description, including acquiring samples of compounds to be identified, and segmenting the samples of the compounds into a subset of samples including an initial identification tag; obtaining a sample legend according to the sample subset; and obtaining a target recognition result corresponding to the sample of the compound to be recognized according to the sample legend and the identification tag. The clustering method based on coarse-grain can increase the processing of compound images, save a lot of molecular feature extraction processes with the minimum use of features, and improve the computational efficiency. Furthermore, based on the preliminary clustering results, small molecule compound clustering is completed by using compound graph processing, which achieves a more efficient and more accurate small molecule compound clustering process with a larger data size.

The above-described application scenarios are merely shown to facilitate an understanding of the present application and embodiments of the present specification are not limited in this respect. Rather, embodiments of the present description may be applied to any scenario where applicable.

The technical solutions provided by various embodiments of the present application are described below with reference to the accompanying drawings.

Figure 2:
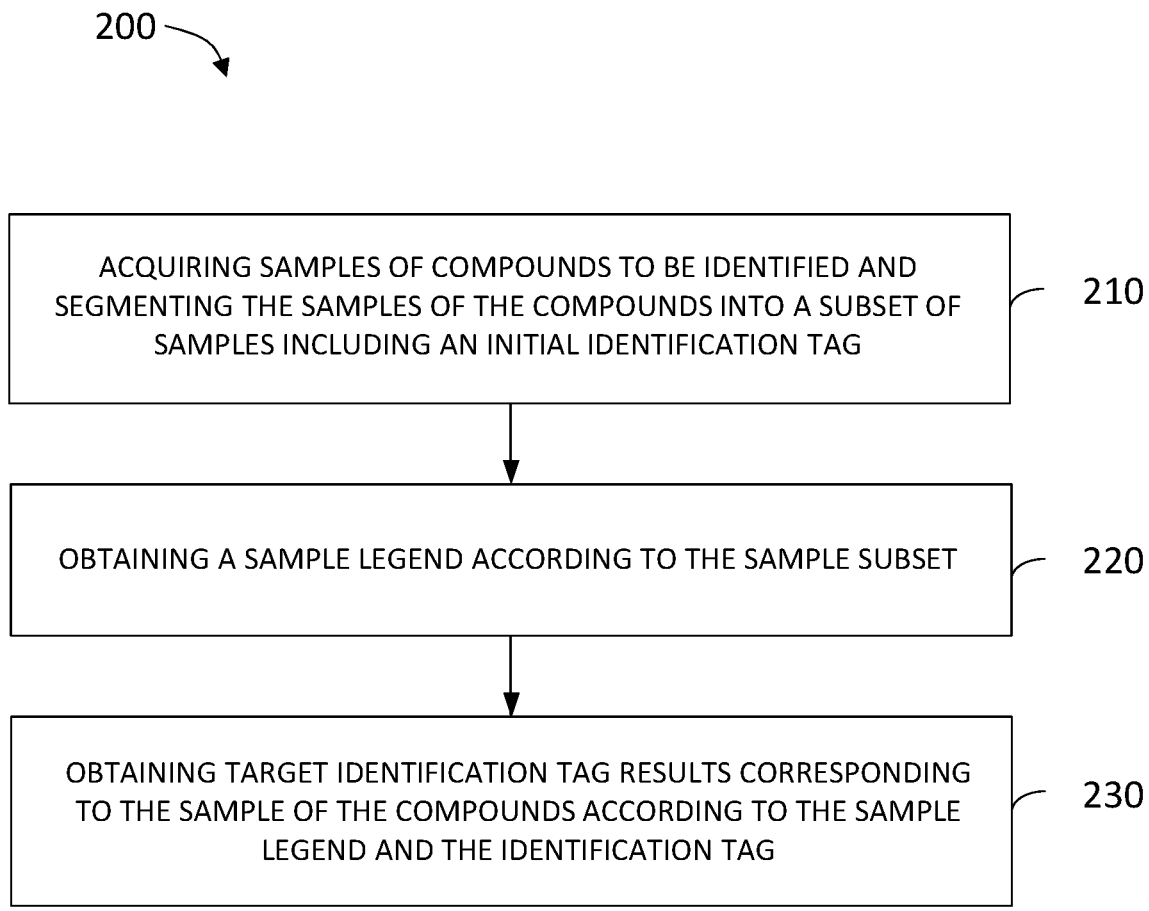
FIG. 2 is a flow chart I of a method for compound clustering provided by an embodiment of the description.

FIG. 2 is a flow chart I of a method for compound clustering 200 provided by an embodiment of the description. As shown in FIG. 2, the method may include steps 210 to 230. The method begins at Step 210 by acquiring samples of compounds to be identified, and segmenting the samples of the compounds into a subset of samples including an initial identification tag.

The sample of compounds to be identified in this embodiment includes large compounds in order to be subdivided into a single small group of similar small molecule compounds by a special clustering method. In some embodiments, the samples of the compounds is in a representation format of SMILES sequence text in which chemical properties of the compound (e.g., including molecular features and atomic properties), etc. may be displayed. In the case of a large amount of data, the samples of the compounds is preliminarily divided into a plurality of sample subsets, so that the complicated samples of the compounds is preliminarily divided to facilitate subsequent processing of the samples of the compounds. A small molecule compound generally refers to a biologically functional molecule with a molecular weight of less than 1000 Daltons in terms of chemistry. According to the biological angle, it generally refers to small peptides, oligopeptides, oligosaccharide oligonucleotides, vitamins, minerals, small molecular group water and the like with biological activity. It can also be classified nutritionally as proteins, fats, sugars, etc.

In some embodiments, according to general statistical clustering methods, samples of existing inventory compounds to be identified can be clustered and identified according to compound attribute features, and the samples of compounds to be identified can not only be segmented to obtain a plurality of sample subsets. Also, an initial identification tag in a segmentation process can be obtained (namely, a representation of the class and number of a single group of similar small molecule compounds identified by clustering the samples of compounds to be identified). In order to achieve simple dimension reduction for more accurate compound clustering, it is convenient to identify the compound samples more quickly to obtain the final target identification tag results. Statistical clustering methods include K-means (k-means clustering algorithm) and OPTICS (Ordering points to identify the clustering structure). In other embodiments, in the case of a large number of samples of compounds to be identified, the process of preliminary clustering identification is not performed, so it is necessary to preliminarily divide all the samples of compounds to be identified into a plurality of sample subsets by using the statistical clustering method. An initial identification tag is generated during the segmentation process, and the implementation process thereof is similar to the above-mentioned K-means or OPTICS, and will not be described in detail here.

The method of FIG. 2 continues with Step 220, obtaining a sample legend according to the sample subset. In conjunction with the above-mentioned embodiment, after dividing the samples of the compounds to be identified into sample subsets, sample legends corresponding to all the samples of the compound to be identified in the sample subset needs to be obtained according to the sample subset. Among them, the sample legends are converted into a corresponding discrete mathematical diagram according to the representation format of the samples of the compounds to be identified, and the processable compound to be identified is converted into a discrete mathematical diagram which is easier to be identified according to the attribute features thereof. The fingerprint features for each compound to be identified are more prominent in the discrete data diagram, thereby facilitating the identification of the most similar feature part among multiple compounds, and improving the accuracy for small molecule compound clustering.

Step 230, obtaining target identification tag results corresponding to the samples of the compounds according to the sample legend and the identification tag. In particular, the identification tag is used to identify the class of the compound, including at least one or more, based on the property of the compound. The sample legend identifies the class of a single set of similar small molecule compounds by an identification tag, thereby obtaining target identification results for all sample legends in the sample subset corresponding to the samples of the compounds. The identification tag includes the class and number of small molecule compounds, etc.

In order to improve the accuracy of small molecule compound clustering, it is necessary to accurately obtain the identification tags for the subset of preliminary segmented samples, and then to obtain the target identification results with higher accuracy for all the samples of compounds to be identified.

In some embodiments, the identification tag includes a legend tag, wherein the legend tag can more highlight the fingerprint feature corresponding to each class of similar small molecule compounds. Therefore, after the samples of compounds to be identified are preliminarily segmented into a plurality of sample subsets with coarse granularity, each sample of the compound in the sample subset represented in a sequence text format is converted into a sample legend. When a target identification result corresponding to the samples of compounds to be identified is obtained according to the sample legend, the initial identification tag is not limited to judging the class of the compound to be identified according to the molecular feature or atomic feature of the compound. It not only improves the accuracy of small molecule compound clustering, but also divides the large number of samples into a relatively small range of data processing based on the preliminary identification and segmentation of coarseness of the samples of the compounds to be identified, which realizes the dimension reduction of the data, and strives for processing space for the subsequent sample legend identification process, i.e. the dimension reduction of the data improves the utilization of the data processing space, and speed up the processing speed of small molecule compound clustering.

In some embodiments, by performing feature extraction on a sample legend and combining with a fingerprint feature corresponding to a compound, the legend tag is obtained after large data training, wherein the legend tag more highlights a specific range of fingerprint features corresponding to connected components of each class of small molecule compounds, which is used for clustering compounds corresponding to the most similar subgraphs into the same class. Among them, the most similar subgraph represents the connected components of a small molecule compound graph, it may include, for example, one or more of the same atoms as well as chemical bonds.

Specifically, image feature point extraction is performed on the sample legends; each sample legend corresponds to each molecule in the compound to be identified and the topological alignment of each molecule; combined with the fingerprint feature corresponding to the compound, it obtains the most similar subgraph feature in the image feature, namely, the most similar subgraph feature between the compounds can be found by identifying the prominent unique distinguishing feature via the image feature. At the same time, a similarity score is calculated, and then whether they belong to the same class is determined according to a threshold value. Thus, after training with a large amount of data, if it is detected that the similarity score corresponding to the feature of the most similar subgraph in any pair of sample legends satisfies the threshold value, the two sample legends are determined to be of the same category, so that the compounds in all the sample legends in the sample subset which have the most similar subgraph in common are assigned to be of the same category, and the legend tag corresponding to the same category is obtained. The legend tag includes the most similar subgraph and a threshold corresponding to the similarity score.

In some embodiments, the obtaining target identification tag results corresponding to the samples of the compounds according to the sample legend and the identification tag includes: clustering the compounds to be identified corresponding to the initial identification tag and the legend tag in the sample legend into a same class according to the sample legend, the initial identification tag and the legend tag; and obtaining identification classes corresponding to all the samples of compounds to be identified respectively according to the initial identification tags and the legend tags corresponding to different classes of compounds.

The identification tags in this embodiment include an initial identification tag and a legend identification tag. Each class of compounds corresponds to a set of initial identification tags and legend identification tags, respectively. Therefore, in the process of performing small molecule compound clustering on the sample legend, by combining the initial identification tag (e.g., Ti1) and the legend identification tag (e.g., Pt1), the compounds to be identified corresponding to the sample legend in the sample subset satisfying both the initial identification tag and the legend tag are clustered into the same class (e.g., compound 1). Furthermore, according to the initial identification tags corresponding to different classes of compounds and the legend tags (e.g. [Ti1, Pt1], [Ti2, Pt2], . . . , [Ti5, Pt5].), the identification classes (e.g., compound 1, compound 2.) corresponding to all samples of the compounds to be identified are respectively obtained.

In some embodiments, the compounds to be identified in the sample legend that satisfy the initial identification tag and the legend tag are clustered into the same class, including: acquiring a sample legend standard diagram corresponding to the initial identification tag and the legend tag reaching a pre-set threshold; and performing similarity calculation on all the sample legends and the sample legend standard diagram, and if the sample legends match the sample legend standard diagram, clustering the compounds to be identified corresponding to the sample legends into the same class.

In conjunction with the above-mentioned embodiments, when the clustering of the compounds to be identified corresponding to the initial identification tag and the legend tag in the sample legend is satisfied to be the same class at the same time, it needs to obtain a sample legend standard diagram corresponding to the same group of initial identification tags and legend tags reaching a pre-set threshold value. Herein, the reaching a preset threshold value for the same group of initial identification tags and legend tags may include that the sum of weights respectively corresponding to the initial identification tags and legend tags reaches the preset threshold value. The small molecule compound clustering can be realized more accurately according to the most similar subgraph contained in the legend tag. Therefore, after the acquiring a sample legend standard diagram corresponding to the initial identification tag and the legend tag reaching a pre-set threshold, similarity calculation is performed on all the sample legends and the sample legend standard diagram. If the sample legends match the sample legend standard diagram, the compounds to be identified corresponding to the sample legends are clustered into the same class with the compounds corresponding to the sample legend standard diagram. Herein, the matching between the sample diagram and the sample legend standard diagram can be calculated by the following formula I:

$$S = G_1 \cap G_2 \quad \text{(Formula I)}$$

where G1 and G2 are the input sample legend and sample legend standard diagram respectively. It is determined whether it is matched by the similarity algorithm of formula II.

$$J(A, B) = \frac{|A \cap B|}{|A \cup B|} = \frac{|A \cap B|}{|A| + |B| - |A \cap B|}. \quad \text{(Formula II)}$$

where A and B respectively represent the node numbers of the compared sample legend and sample legend standard diagram, and the $|A \cap B|$ represents the common node numbers of the nodes of graph A and graph B. That is, when J (A, B) is equal to the preset threshold, the sample legend matches with the sample legend standard diagram. Finally, the compounds to be identified corresponding to the sample legend are clustered into the same class as the compounds corresponding to the sample legend standard diagram.

In some embodiments, the obtaining a sample legend according to the sample subset includes: converting each sample of the compounds to be identified in the sample subset into a corresponding sample legend according to attribute features of the compounds in the sample subset.

Specifically, according to the attribute features of the compound to be identified in the sample subset, such as the molecular features of the compound, the log P (oil-water partition coefficient), the number of rings and the atomic features, it is converted into a data graph with the atom regarded as a node, and the chemical bond as an edge, based on the compound to be identified represented by the processable data (such as the compound represented by the text of the SMILES sequence). In some examples, the node includes an atom number attribute, and the edge includes a single-double triple bond attribute.

In some embodiments, after the obtaining target identification tag results corresponding to the samples of the compounds, it further includes outputting the target identification tag result, and storing the samples of the compounds corresponding to the target identification tag result. Subsequent applications or data storage downstream of small molecule compound clustering are realized. Therefore, the compound clustering method of the present invention can not only realize small molecule compound clustering quickly and accurately, but also improve the high efficiency and accuracy of the application of associated small molecule compound clustering. Some embodiments are schematically described below.

FIG. 3 is a flow chart II of a method for compound clustering 300 provided by an embodiment of the present invention. As shown in FIG. 3, an embodiment of the present invention employs the following preferred steps. At Step 310, the samples of the compound to be identified are input in the SMILES sequence text format. Next, at Step 320, the samples of the compounds to be identified are segmented into a subset of samples containing the initial identification tag according to statistical clustering. Next, at Step 330, the samples of the compounds to be identified in the SMILES sequence text format in the sample subset are converted into a discrete mathematical graph. At Step 340, by the topological comparison, the most similar structure is calculated and the legend tag is obtained. At Step 350, target identification tag results corresponding to the samples of the compounds to be identified are obtained according to the sample legends (namely, a discrete mathematical graph). Finally, at Step 350, the initial identification tags and the legend tags, so as to output the clustering results of the samples of the compounds to be identified in the SMILES sequence.

EXAMPLE 1

Step 1, samples of the compounds to be identified in SMILES sequence text are obtained.

Step 2, a sample subset corresponding to small molecule compound clustering is for obtained by statistical clustering, for example, the initial identification tag is Ti2. Statistical clustering methods include K-means and OPTICS et al.

Step 3, the compounds to be identified in the sample subset expressed in SMILES sequence text are converted into corresponding sample legends.

Step 4, target identification tag results corresponding to the samples of the compounds is obtained according to sample legend and the identification tag. For example, compounds that do not belong to the Ti2 class are excluded from the sample subset based on the preliminary identification tag (Ti2). It further includes that a sample legend standard diagram corresponding to the initial identification tag and the legend tag reaching a pre-set threshold value is acquired according to the sample legend, the initial identification tag and the legend tag; similarity calculation is performed on all the sample legends and the sample legend standard diagram, and if the sample legends matches the sample legend standard diagram, the compounds to be identified corresponding to the sample legends are clustered into the same category. For example, the compounds belonging to the Ti2 class are identified in the sample subset. Finally, the compounds belonging to the Ti2 class are rejected more accurately. Thereby, the target identification tag results corresponding to all the compounds to be identified are obtained.

Step 5, the clustered subset of samples are output for subsequent downstream analysis applications or data storage.

EXAMPLE 2

Step 1, samples of the compounds to be identified in SMILES sequence text are obtained.

Step 2, the chemical property feature calculation is performed by a function in a Python (one of program languages) RDKit package (one of running codes) to obtain sample subsets corresponding to at least two small molecule compound clusters through statistical clustering. For example, the initial identification tags are at least two of Ti1, Ti2, Ti3 and Ti4. Statistical clustering methods include K-means and OPTICS et al.

Step 3, the compounds to be identified in the sample subset expressed in SMILES sequence text are converted into corresponding sample legends.

Step 4, target identification tag results corresponding to the samples of the compounds is obtained according to sample legend and the identification tag. For example, the compounds corresponding to the three classes Ti1, ti2 and Ti4 are finally accurately identified in the subset of samples based on preliminary identification tags (e.g., Ti1, ti2 and Ti3). Further, the compounds to be identified corresponding to the initial identification tag and the legend tag in the sample legend are clustered into the same class according to the sample legend, the initial identification tag and the legend tag. According to the initial identification tags and legend tags corresponding to different classes of compounds, the identification classes corresponding to all the samples of compounds to be identified are obtained respectively.

Step 5, the clustered subset of samples are output for subsequent downstream analysis applications or data storage.

EXAMPLE 3

Step 1, samples of the compounds to be identified in SMILES sequence text are obtained.

Step 2, features of the compounds to be identified are obtained, such as a Morgan Fingerprints (molecular fingerprint) or a embedding variable after intensive learning training; and data (dimension reduction) is performed by the PCA algorithm, and after reducing to a data feature of 10-100 dimensions, a sample subset corresponding to at least two small molecule compound clusters is obtained by statistical clustering; for example, the initial identification tags are at least two of Ti1, ti2, ti3 and Ti4. Statistical clustering methods include, for example, K-means.

Step 3, the compounds to be identified in the sample subset expressed in SMILES sequence text are converted into corresponding sample legends.

Step 4, target identification tag results corresponding to the samples of the compounds is obtained according to sample legend and the identification tag. For example, the compounds corresponding to the four classes Ti1, Ti2, Ti4 and Ti5 are finally accurately identified in the subset of samples based on the preliminary identification tags (Ti1, Ti2 and Ti3). Further, the compounds to be identified corresponding to the initial identification tag and the legend tag in the sample legend are clustered into the same class according to the sample legend, the initial identification tag and the legend tag. According to the initial identification tags and legend tags corresponding to different classes of compounds, the identification classes corresponding to all the samples of compounds to be identified are obtained respectively.

Step 5, the clustered subset of samples are output for subsequent downstream analysis applications or data storage.

Figure 4:
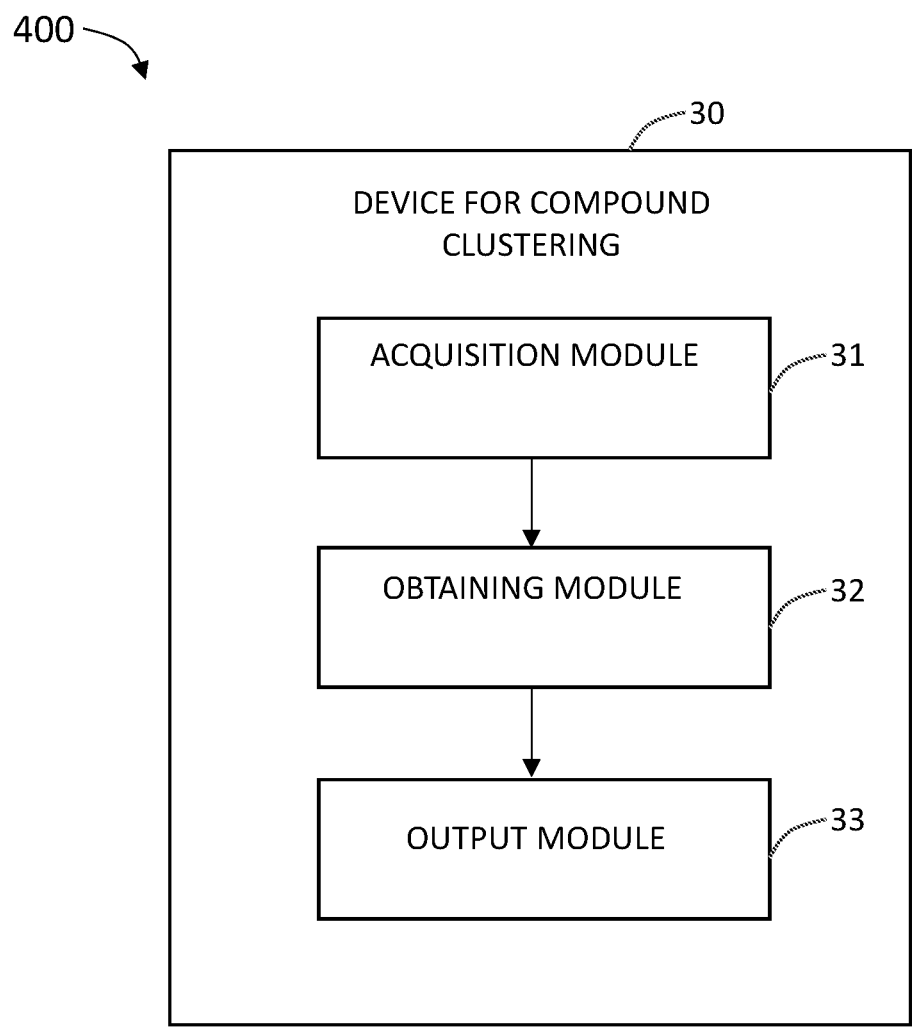
FIG. 4 is a schematic diagram of a device for compound clustering provided by an embodiment of the description.

FIG. 4 is a schematic diagram of a device for compound clustering 400 provided by an embodiment of the description. As shown in FIG. 4, the device 30 includes:

an acquisition module 31 configured for acquiring samples of compounds to be identified, and segmenting the samples of the compounds into a subset of samples including an initial identification tag;

an obtaining module 32 configured for obtaining a sample legend according to the sample subset; and an output module 33 configured for obtaining target identification tag results corresponding to the samples of the compounds according to the sample legend and the identification tag, wherein the identification tag includes the initial identification tag.

The device of the embodiment shown in FIG. 4 can correspondingly be used to perform the steps in the embodiment of the method shown in FIG. 2, the principle of implementation and the technical effect of which are similar and will not be described in detail here.

Figure 5:
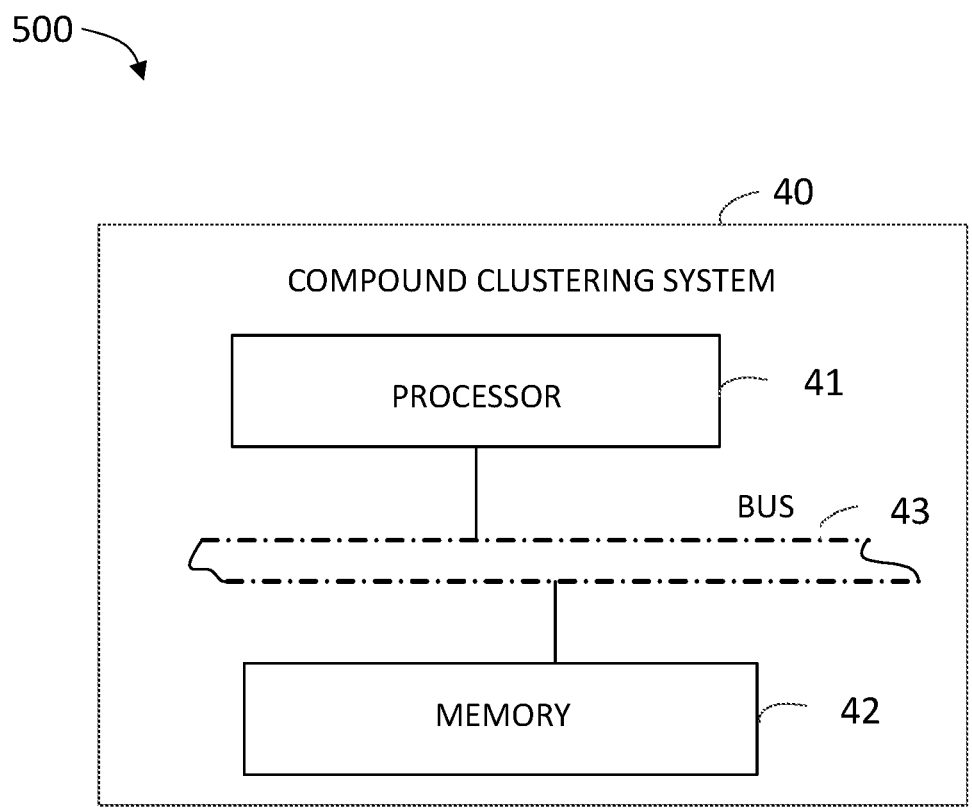
FIG. 5 is a structure diagram of a system for compound clustering provided by an embodiment of the description.

FIG. 5 is a structure diagram of a system for compound clustering 500 provided by an embodiment of the description. As shown in FIG. 5, the system 40 includes a processor 41, a memory 42 and a computer program; wherein The memory 42 is configured for storing the computer program and may also be a flash. The computer program is, for example, an application, a functional module or the like implementing the method described above.

The processor 41 is configured for executing the memory-stored computer program to implement the various steps performed by the device in the method described above. Reference is made in detail to the foregoing description of the process embodiments.

Alternatively, the memory 42 may be separate or integrated with the processor 41.

When the memory 42 is a device separate from the processor 41, the device may further include:

a bus 43 configured for connecting the memory 42 and the processor 41.

The present invention also provides a readable storage medium having stored therein a computer program which when executed by a processor implements the methods provided by the various embodiments described above.

The readable storage medium can be either a computer storage medium or a communication medium. The communication medium includes any medium that facilitates transfer of a computer program from one place to another. The computer storage medium can be any available medium that can be accessed by a general purpose or special purpose computer. For example, the readable storage medium is coupled to the processor such that the processor can read information from, and write information to, the readable storage medium. Of course, the readable storage medium may also be integral to the processor. The processor and the readable storage medium may be located on an application specific integrated circuit (ASIC). In addition, the ASIC may be located in the user equipment. Of course, the processor and the readable storage medium may also reside as discrete components in a communication device. The readable storage medium may be a read only memory (ROM), a random access memory (RAM), a CD-ROM, a magnetic tape, a floppy disk, an optical data storage device, etc.

The present invention also provides a program product including execution instructions stored on the readable storage medium. The at least one processor of the equipment may read the execution instructions from the readable storage medium, the execution of which by the at least one processor causes the equipment to implement the methods provided by the various embodiments described above. In the embodiment of the device described above, it should be understood that the processor may be a central processing unit (CPU), can also be other general-purpose processors, digital signal processors (DSP), Application Specific Integrated Circuits (ASIC) and the like. The general purpose processor may be a microprocessor or the processor may be any conventional processor or the like. The steps of the methods disclosed in connection with the present invention may be embodied directly in a hardware processor for execution, or in a combination of hardware and software modules within the processor for execution.

Each embodiment of the present description is described in a progressive manner with reference to the same or similar parts throughout the various embodiments, and each embodiment is intended to cover variations from the other embodiments. In particular, for the embodiment of the product to be described later, since it corresponds to the method, the description is relatively simple, and it is sufficient to refer to part of the description of the embodiment of the system.

Although only the specific embodiments of the present application have been described above, the scope of the present application is not limited thereto, and any changes or substitutions which can be easily conceived by those skilled in the art within the technical scope disclosed in the present application should be covered by the present application. Accordingly, the scope of protection in this application shall be subject to the scope of the claims.

What is claimed is:

1. A method for compound clustering, characterized in that the method comprises:
   acquiring samples of compounds to be identified, and segmenting the samples of the compounds into a subset of samples including an initial identification tag;
   obtaining a sample legend according to the sample subset;
   training and obtaining a legend tag by performing feature extraction on the sample legend and combining with fingerprint features corresponding to the compound;
   obtaining target identification tag results corresponding to the samples of the compounds according to the sample legend and an identification tag, wherein the identification tag includes the initial identification tag and the legend tag, wherein obtaining the target identification tag results corresponding to the samples of the compounds according to the sample legend, and the identification tag comprises:
   clustering the compounds to be identified corresponding to the initial identification tag and the legend tag in the sample legend into a same class according to the sample legend, the initial identification tag, and the legend tag; and
   obtaining identification classes corresponding to all the samples of compounds to be identified respectively according to the initial identification tags and the legend tags corresponding to different classes of compounds.

2. The method according to claim 1, characterized in that the clustering the compounds to be identified corresponding to the initial identification tag and the legend tag in the sample legend into a same class comprises:
   acquiring a sample legend standard diagram corresponding to the initial identification tag and the legend tag reaching a pre-set threshold; and
   performing similarity calculations on all the sample legends and the sample legend standard diagram, and if the sample legends matches the sample legend standard diagram, clustering the compounds to be identified corresponding to the sample legends into the same class.

3. The method according to claim 1, characterized in that the obtaining a sample legend according to the sample subset comprises:
   converting each sample of the compounds to be identified in the sample subset into a corresponding sample legend according to attribute features of the compounds in the sample subset.

4. The method according to claim 1, characterized by, after obtaining target identification tag results corresponding to the samples of the compounds, further comprising:
   outputting the target identification tag result and storing the samples of the compounds corresponding to the target identification tag results.

5. A device for compound clustering, characterized in that the device comprises:
   an acquisition module configured for acquiring samples of compounds to be identified, and segmenting the samples of the compounds into a subset of samples including an initial identification tag;
   an obtaining module configured for:
   obtaining a sample legend according to the sample subset;
   training and obtaining a legend tag by performing feature extraction on the sample legend and combining with fingerprint features corresponding to the compound;
   an output module configured for obtaining target identification tag results corresponding to the samples of the compounds according to the sample legend and an identification tag, wherein the identification tag includes the initial identification tag and the legend tag, wherein obtaining the target identification tag results corresponding to the samples of the compounds according to the sample legend, and the identification tag comprises:
   clustering the compounds to be identified corresponding to the initial identification tag and the legend tag in the sample legend into a same class according to the sample legend, the initial identification tag, and the legend tag; and obtaining identification classes corresponding to all the samples of compounds to be identified respectively according to the initial identification tags and the legend tags corresponding to different classes of compounds.

6. A system for compound clustering, characterized by comprising:
   a memory;
   a processor; and
   a computer program, wherein the computer program is stored in the memory, and wherein the processor executes the computer program to perform the method for compound clustering of any one of claims 1 and 2-4.

7. A non-transitory computer readable storage medium, characterized in that the non-transitory computer readable storage medium has stored therein a computer program which when executed by a processor implements the method for compound clustering of any one of claims 1 and 2.

* * * * *